(12) United States Patent
Zhang et al.

(10) Patent No.: US 11,063,769 B2
(45) Date of Patent: *Jul. 13, 2021

(54) BLOCKCHAIN DATA PROTECTION BASED ON GENERIC ACCOUNT MODEL AND HOMOMORPHIC ENCRYPTION

(71) Applicant: Advanced New Technologies Co., Ltd., Grand Cayman (KY)

(72) Inventors: Wenbin Zhang, Hangzhou (CN); Baoli Ma, Hangzhou (CN); Huanyu Ma, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,533

(22) Filed: Jul. 31, 2020

(65) Prior Publication Data
US 2020/0366503 A1   Nov. 19, 2020

Related U.S. Application Data

(63) Continuation of application No. 16/422,853, filed on May 24, 2019, now Pat. No. 10,790,987, which is a (Continued)

(51) Int. Cl.
H04L 9/32 (2006.01)
G06F 7/58 (2006.01)
(Continued)

(52) U.S. Cl.
CPC .............. H04L 9/3247 (2013.01); G06F 7/58 (2013.01); G06N 7/005 (2013.01); H04L 9/008 (2013.01);
(Continued)

(58) Field of Classification Search
CPC ......... H04L 9/3247; H04L 9/30; H04L 9/088; G06N 7/005
See application file for complete search history.

(56) References Cited

U.S. PATENT DOCUMENTS 5,394,116 A   2/1995   Kasturia
7,240,034 B1  7/2007   Remery et al.
(Continued)

FOREIGN PATENT DOCUMENTS

CN   107656812   2/2018
CN   108021821   5/2018
(Continued)

OTHER PUBLICATIONS

Acar et al., "A Survey on Homomorphic. Encryption Schemes: Theory and Implementation," ACM Computing Surveys, Jul. 2018, 51(4):1-35.
(Continued)

*Primary Examiner* — Samson B Lemma
*Assistant Examiner* — Abdullah Almamun
(74) *Attorney, Agent, or Firm* — Fish & Richardson P.C.

(57) ABSTRACT

Implementations of the specification include receiving transaction data associated with the transaction, the transaction data comprising: data representative of a plurality of assets, a first commitment hiding a first random number and a transaction amount of the transaction, a second commitment that hides a second random number and a change, the transaction amount and a third random number both encrypted by a public key of the second node, the change and a fourth random number both encrypted by a public key of the first node, and a zero-knowledge proof (ZKP); determining, based on the ZKP, whether the transaction is valid based on determining if the first random number is equal to the third random number, the second random number is
(Continued)

equal to the fourth random number, and the transaction amount hidden in the first commitment is equal to the transaction amount encrypted by the public key of the second node.

17 Claims, 8 Drawing Sheets

Related U.S. Application Data continuation of application No. PCT/CN2018/122573, filed on Dec. 21, 2018.

(51) Int. Cl.
  *G06N 7/00* (2006.01)
  *H04L 9/08* (2006.01)
  *H04L 9/30* (2006.01)
  *H04L 9/00* (2006.01)

(52) U.S. Cl.
  CPC ............... *H04L 9/088* (2013.01); *H04L 9/30* (2013.01); *H04L 9/3218* (2013.01); *H04L 9/3239* (2013.01); *H04L 2209/38* (2013.01)

(56) References Cited

U.S. PATENT DOCUMENTS

| | | | |
|---|---|---|---|
| 8,667,292 B2* | 3/2014 | Danezis | H04L 9/3247 713/179 |
| 8,731,199 B2* | 5/2014 | Jawurek | H04L 9/3221 380/268 |
| 9,635,000 B1 | 4/2017 | Muftic | |
| 2009/0177591 A1 | 7/2009 | Thorpe et al. | |
| 2009/0327141 A1 | 12/2009 | Rabin et al. | |
| 2014/0258027 A1 | 9/2014 | Veugen | |
| 2015/0242825 A1 | 8/2015 | Mills | |
| 2016/0055322 A1 | 2/2016 | Thomas | |
| 2016/0358165 A1 | 12/2016 | Maxwell | |
| 2017/0041132 A1 | 2/2017 | Nicholls | |
| 2017/0346833 A1 | 11/2017 | Zhang | |
| 2018/0219671 A1 | 2/2018 | Velissarios et al. | |
| 2018/0117446 A1 | 5/2018 | Tran et al. | |
| 2018/0137512 A1 | 5/2018 | Georgiadis et al. | |
| 2018/0285838 A1 | 10/2018 | Franaszek et al. | |
| 2018/0337775 A1 | 11/2018 | Camenisch et al. | |
| 2019/0026146 A1 | 1/2019 | Peffers et al. | |
| 2019/0164153 A1 | 5/2019 | Agrawal et al. | |
| 2019/0165943 A1 | 5/2019 | Chari et al. | |
| 2019/0180558 A1 | 6/2019 | Merati | |
| 2019/0229919 A1* | 7/2019 | Gurkan | H04L 9/0869 |
| 2019/0229921 A1* | 7/2019 | Pulsifer | H04L 9/088 |
| 2019/0244290 A1* | 8/2019 | Massacci | G06F 21/64 |
| 2019/0251527 A1 | 8/2019 | Surdak | |
| 2019/0327078 A1 | 10/2019 | Zhang et al. | |

FOREIGN PATENT DOCUMENTS

| | | |
|---|---|---|
| CN | 108418689 | 8/2018 |
| CN | 108764874 | 11/2018 |
| CN | 109035029 | 12/2018 |
| CN | 109039648 | 12/2018 |
| CN | 108418783 | 8/2020 |
| EP | 0822683 | 2/1998 |
| JP | 2018007168 | 1/2018 |
| JP | 2019537348 | 12/2019 |
| JP | 2020515885 | 5/2020 |
| KR | 101879353 | 7/2018 |
| RU | 2015145232 | 5/2017 |
| RU | 2674329 | 6/2018 |
| WO | WO 2016049406 | 3/2016 |
| WO | WO 2019105407 | 6/2019 |
| WO | WO 2018087836 | 7/2019 |

OTHER PUBLICATIONS

Ben-Sasson et al., "Zerocash: Decentralized Anonymous Payments from Bitcoin," International Association for Cryptologic Research, May 2014, May 19, 2014:163647, pp. 1-56.

Bünz et al., "Bulletpruffs: Short Proofs for Confidential Transactions and More," IEEE, 2018, 45 pages.

Extended European Search Report in European Application No. 18865599.7, dated Feb. 10, 2020, 7 pages.

Extended European Search Report in European Application No. 18867276.0, dated Jan. 30, 2020, 9 pages.

Franca, semanticscholar.org [online], "Homomorphic Mini-blockchain Scheme," Apr. 2015, retrieved on Jan. 30, 2020, retrieved from URL<https://pdfs.semanticscholar.org/ab9f/b027061fb4aa8ed8017d63002f586a18eab6.pdf>, 17 pages.

Harikrishnan et al. "Secure Digital Service Payments using Zero Knowledge Proof in Distributed Network," 2019 5th international Conference on Advanced Computing & Communication Systems (ICACCS), 2019, pp. 307-312.

Koens et al., "Efficient Zero-Knowledge Range Proofs in Ethereum," ING, 2017, 10 pages.

Miers et al., "Zerocoin: Anonymous Distributed E-Cash from Bitcoin," Security and Privacy, May 2013, pp. 397-411.

Narula et al., "zkLedger: Privacy-Preserving Auditing for Distributed Ledgers," 15th USENIX Symposium on Networked Systems Design and Implementation, Apr. 2018, pp. 65-77.

PCT International Search Report and Written Opinion in International Application No. PCT/CN2018/122539, dated Sep. 25, 2019, 8 pages.

PCT International Search Report and Written Opinion in International Application No. PCT/CN2018/122573, dated Sep. 6, 2019, 6 pages.

Miers et al., "Zerocoin: Anonymous Distributed E-Cash from Bitcoin", IEEE Symposium on Security and Privacy, pp. 397-411, 2013.

Naganuma et al., "Auditable Zerocoin", 2017 Cryptography and information security Symposium (SCIS2017) Draft [USB], Japan, 2017 Cryptography and Information Security Symposium, 1F2-1, p. 1-5, 2017, (English Abstract).

Yasusaka et at., "A privacy-preserving pre-consensus protocol for blockchain", Symposium Series of the Information Processing Society of Japan, vol. 2018; No. 2, pp. 850-856, 2018 (English Abstract).

Naganuma et al., "Hyperledger Fabric Decentralized netting protocol using over Hyperledger Fabric", Japan, electronic information Telecommunications Society of Japan, 7 pages, Jan. 26, 2018 (English Abstract).

Kuribayashi et al., "Recent Fingerprinting Techniques with Cryptographic Protocol", 10, 197-217, 2010.

* cited by examiner

BLOCKCHAIN DATA PROTECTION BASED ON GENERIC ACCOUNT MODEL AND HOMOMORPHIC ENCRYPTION

CROSS-REFERENCE TO RELATED APPLICATIONS

This application is a continuation of U.S. patent application Ser. No. 16/422,853, filed on May 24, 2019, which is a continuation of PCT Application No. PCT/CN2018/122573, filed on Dec. 21, 2018, each application is hereby incorporated by reference in its entirety.

BACKGROUND

Blockchain networks, which can also be referred to as blockchain systems, consensus networks, distributed ledger system networks, or blockchain, enable participating entities to securely and immutably store data. A blockchain can be described as a ledger of transactions and multiple copies of the blockchain are stored across the blockchain network. Example types of blockchains can include public blockchains, consortium blockchains, and private blockchains. A public blockchain is open for all entities to use the blockchain, and participate in the consensus process. A consortium blockchain is a blockchain where the consensus process is controlled by a pre-selected set of nodes such as certain organizations or institutions. A private blockchain is provided for a particular entity, which centrally controls read and write permissions.

Blockchains can use different record-keeping models to record transactions between users. Example record-keeping models include the unspent transaction output (UTXO) model and the account balance model. In the UTXO model, each transaction spends output from prior transactions and generates new outputs that can be spent in subsequent transactions. A user's unspent transactions are tracked, and a balance that is available to spend is calculated as the sum of the unspent transactions. In the account balance model, each user's account balance is tracked as a global state. For each transaction, a balance of a spending account is checked to make sure it is larger than, or equal to, the transaction amount. This is comparable to traditional banking.

A blockchain includes a series of blocks, each of which contains one or more transactions executed in the network. Each block can be analogized to a page of the ledger, while the blockchain itself is a full copy of the ledger. Individual transactions are confirmed and added to a block, which is added to the blockchain. Copies of the blockchain are replicated across nodes of the network. In this manner, there is global consensus on the state of the blockchain. Further, the blockchain is open for all nodes to see, at least in the case of public networks. To protect privacy of blockchain users, encryption technologies are implemented.

Under the account balance model, commitment schemes can be used to hide values that both parties of a transaction commit to. Commitment schemes can arise out of the need for parties to commit to a choice or value, and later communicate that value to the other parties involved. For example, in an interactive Pedersen commitment (PC) scheme, a first user can commit to a transaction amount t by sending a commitment value PC(t, r) that is generated based on random value r. The commitment value is generated, and a second user can only reveal the transaction amount t by obtaining the random number r. To ensure that the transaction amount is valid, a range proof can be created to prove that the transaction amount is greater than or equal to zero and less than or equal to the account balance.

In some cases, multiple transactions can be made from a user. Because the range proof is associated with the remaining balance of the account, the multiple transactions need to be verified sequentially in the blockchain. As such, the corresponding range proofs can be correctly associated with the remaining balances of the account after each transaction. However, verifying multiple transactions sequentially can be time-consuming. A record-keeping model that allows parallel verifications of transactions would be advantageous especially for time-sensitive tasks.

SUMMARY

Implementations of the specification include computer-implemented methods for non-interactive privacy-preserving verifications of blockchain transactions. More particularly, implementations of the specification are directed to a computer-implemented method capable of validating multiple transactions associated with an account of a blockchain node in parallel, based on commitment schemes and homomorphic encryption without revealing privacy information, such as transaction amount, account balances, or random numbers for generating commitments, to other blockchain nodes.

In some implementations, actions include receiving transaction data associated with the transaction, the transaction data comprising: data representative of a plurality of assets, a first commitment that hides a first random number and a transaction amount of the transaction, a second commitment that hides a second random number and a change calculated based on deducting the transaction amount from a total value of the plurality of assets, the transaction amount and a third random number both encrypted by a public key of the second node based on a linear deterministic encryption (HE) scheme, the change and a fourth random number both encrypted by a public key of the first node based on the linear deterministic HE scheme, one or more range proofs, a zero-knowledge proof (ZKP), and a digital signature generated based on a private key corresponding to the public key of the first node; verifying the digital signature based on the public key of the first node; determining that the one or more range proofs prove that the transaction amount and the change are each greater than, or equal to, zero; determining that the total value of the plurality of assets equals a sum of the transaction amount and the change; and determining, based on the ZKP, that the transaction is valid by determining that the first random number is equal to the third random number, the second random number is equal to the fourth random number, and the transaction amount hidden in the first commitment is equal to the transaction amount encrypted by the public key of the second node. Other implementations include corresponding systems, apparatus, and computer programs, configured to perform the actions of the methods, encoded on computer storage devices.

These and other implementations may each optionally include one or more of the following features: the transaction is performed between an account associated with the first node and an account associated with the second node, and the method further comprises updating, after determining that the transaction is valid, the account of the first node and the account of the second node based on the transaction amount and the change; each of the plurality of assets is associated with one or more of an asset type, an asset value hidden in a commitment, and a random number used for generating the commitment; determining that each of the plurality of assets is associated with a same asset type; the first commitment, the second commitment, and the commitment that hides the asset value are generated based on a commitment scheme that is homomorphic, and wherein the determining that the total value of the plurality of assets equals the sum of the transaction amount and the change is performed based on homomorphism of the commitment scheme; the linear deterministic HE scheme is derived from a probabilistic HE scheme based on changing a random number associated with the probabilistic HE scheme to a fixed number; the ZKP comprises a commitment that hides a fifth random number and a sixth random number, a cyphertext of the fifth random number and the sixth random number encrypted by the public key of the second account based on the linear deterministic HE scheme, and a cyphertext of the fifth random number and the sixth random number encrypted by the public key of the first account based on the linear deterministic HE scheme; the ZKP is generated and used for determining that the transaction is valid based on properties of the linear deterministic HE; the determining that the transaction is valid is performed based on the ZKP without interactions between the first node and the second node through outside of the blockchain network.

The specification also provides one or more non-transitory computer-readable storage media coupled to one or more processors and having instructions stored thereon which, when executed by the one or more processors, cause the one or more processors to perform operations in accordance with implementations of the methods provided herein.

The specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the subject matter described in this specification can be implemented so as to realize particular advantages or technical effects. For example, implementations of the specification permits account balance and transaction amount of blockchain nodes to be private during transactions. The recipient of fund transfer does not need to confirm the transaction or use a random number to verify a commitment, the transaction validation can be non-interactive. A blockchain node can validate the transaction based on HE and commitment schemes to allow zero-knowledge proof.

The described methodology permits enhancement of account/data security of various mobile computing device. The balance of the accounts and transaction amounts can be encrypted based on HE and hidden by commitment schemes. As such, a consensus node can update the account balances in the ledger after transaction based on properties of HE without revealing the actual account balance of the account. Because the random number does not need to be sent to a recipient to confirm the transaction, the risk of data leakage can be reduced and less computing and memory resources need to be used to manage the random number.

It is appreciated that methods in accordance with the specification may include any combination of the aspects and features described herein. That is, methods in accordance with the specification are not limited to the combinations of aspects and features specifically described herein, but also include any combination of the aspects and features provided.

The details of one or more implementations of the specification are set forth in the accompanying drawings and the description below. Other features and advantages of the specification will be apparent from the description and drawings, and from the claims.

DESCRIPTION OF DRAWINGS

Like reference symbols in the various drawings indicate like elements.

DETAILED DESCRIPTION

Figure 1:
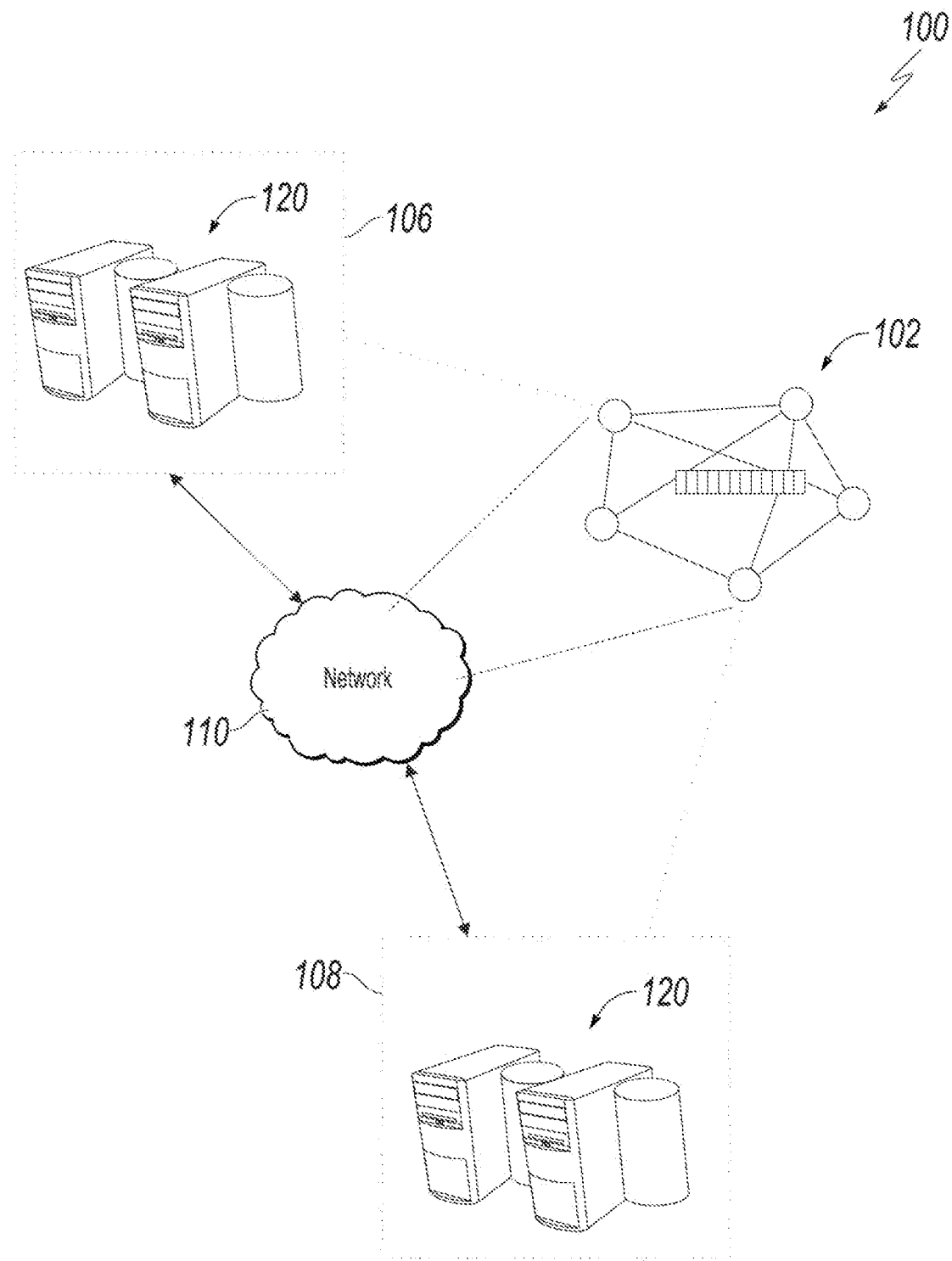
FIG. 1 depicts an example of an environment that can be used to execute implementations of the specification.

Implementations of the specification include computer-implemented methods for non-interactive privacy-preserving verifications of blockchain transactions. More particularly, implementations of the specification are directed to a computer-implemented method capable of validating multiple transactions associated with an account of a blockchain node in parallel, based on commitment schemes and homomorphic encryption without revealing privacy information, such as transaction amount, account balances, or random numbers for generating commitments, to other blockchain nodes. In some implementations, actions include receiving transaction data associated with the transaction, the transaction data comprising: data representative of a plurality of assets, a first commitment that hides a first random number and a transaction amount of the transaction, a second commitment that hides a second random number and a change calculated based on deducting the transaction amount from a total value of the plurality of assets, the transaction amount and a third random number both encrypted by a public key of the second node based on a linear deterministic homomorphic encryption (HE) scheme, the change and a fourth random number both encrypted by a public key of the first node based on the linear deterministic HE scheme, one or more range proofs, a zero-knowledge proof (ZKP), and a digital signature generated based on a private key corresponding to the public key of the first node; verifying the digital signature based on the public key of the first node; determining that the one or more range proofs prove that the transaction amount and the change are each greater than, or equal to, zero; determining that the total value of the plurality of assets equals a sum of the transaction amount and the change; and determining, based on the ZKP, that the transaction is valid by determining that the first random number is equal to the third random number, the second random number is equal to the fourth random number, and the transaction amount hidden in the first commitment is equal to the transaction amount encrypted by the public key of the second node. Other implementations include corresponding systems, apparatus, and computer programs, configured to perform the actions of the methods, encoded on computer storage devices.

To provide further context for implementations of the specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Blockchain is used herein to generally refer to a DLS without reference to any particular use case.

A blockchain is a data structure that stores transactions in a way that the transactions are immutable, and can be subsequently verified. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a data structure for storing transactions, a blockchain network is a network of computing nodes that manage, update, and maintain one or more blockchains. As introduced above, a blockchain network can be provided as a public blockchain network, a private blockchain network, or a consortium blockchain network.

In a public blockchain, the consensus process is controlled by nodes of the consensus network. For example, hundreds, thousands, even millions of entities can participate in a public blockchain, each of which operates at least one node in the public blockchain. Accordingly, the public blockchain can be considered a public network with respect to the participating entities. In some examples, a majority of entities (nodes) must sign every block in order for the block to be valid and added to the blockchain. Example public blockchain networks include particular peer-to-peer payment networks that leverage a distributed ledger, referred to as blockchain. As noted above, the term blockchain, however, is used to generally refer to distributed ledgers without particular reference to any particular blockchain network.

In general, a public blockchain supports public transactions. A public transaction is shared with all of the nodes within the blockchain, and the blockchain is replicated across all nodes. That is, all nodes are in perfect state of consensus with respect to the blockchain. To achieve consensus (e.g., agreement to the addition of a block to a blockchain), a consensus protocol is implemented within the blockchain network. Example consensus protocols include, without limitation, proof-of-work (POW), proof-of-stake (POS), and proof-of-authority (POA). POW is referenced further herein as a non-limiting example.

Implementations of the specification include computer-implemented methods for non-interactive privacy-preserving verifications of blockchain transactions. More particularly, implementations of the specification are directed to a computer-implemented method capable of validating multiple transactions associated with an account of a blockchain node in parallel, based on commitment schemes and homomorphic encryption without revealing privacy information, such as transaction amount, account balances, or random numbers for generating commitments, to other blockchain nodes.

According to the implementations of the specification, blockchain nodes can use a generic account model that can support parallel transaction verifications as a record-keeping method. Compared to the account balance model, blockchain nodes that adopt the generic account model can keep records of a plurality of assets instead of account balances. Each of the plurality of assets can be associated with at least one of an asset type, an asset ID, or an asset value. The asset under the generic account model can be in any form or type such as monetary or fixed. Monetary assets can include real currency or cryptocurrency. In some implementations, fixed assets can be converted to monetary assets associated with a monetary amount. The monetary amount can then be used to perform transactions between accounts of a blockchain network. For illustration purposes, it is assumed that the assets described in the implementations of the specification are converted to the same type of currency and saved in the blockchain accounts under the generic account model.

To protect data privacy, transactions can be recorded to a blockchain (ledger) based on commitment without revealing the transaction amount or monetary amount information associated with blockchain user accounts. A commitment scheme can be used to generate a commitment of a transaction amount using a random number. An example commitment scheme includes, without limitation, the PC scheme. Because the transaction amount is hidden in the commitment, one or more range proofs can be used to prove that the transaction amount does not exceed the value of the blockchain user account.

Under the account balance model, the range proofs are associated with the account balance. If more than one transaction is made, but not all the transactions are validated and recorded on the blockchain, the range proofs may be associated with incorrect account balances, hence may be invalid. In comparison, under the generic account model, the account value can be calculated as the sum of a plurality of assets. When a transaction amount is to be transferred between blockchain user accounts, at least a portion of the plurality of assets with combined value greater than, or equal to the transaction amount can be used to cover the transaction amount. Additional transfers can be made under the condition that the remaining assets having a combined value greater than the amount to be transferred. Even if the transactions are not validated and recorded on the blockchain, the range proofs showing that the combined value of the remaining assets is greater than, or equal to, the transaction amount can still be valid. Therefore, more than one transaction verification can be performed in parallel under the generic account model.

According to the implementations of the specification, blockchain transactions can be validated and recorded to a blockchain (ledger) based on commitment without revealing the transaction account balance, transaction amount, or random number used to generate the commitment. A commitment scheme, such as the PC scheme, can be used to generate a commitment of a transaction amount based on a random number. The transaction amount and the random number can be encrypted using probabilistic or linear deterministic HE. The transaction amount and the random number can also be used to generate a set of values as ZKP for validating the transaction based on properties of the HE scheme used. The commitment of the transaction amount, the encrypted transaction amount and random number, and the ZKP can be used by a blockchain node to verify whether the transaction is valid without the account balances, the transaction amount, or the random number being revealed.

FIG. 1 depicts an example of an environment 100 that can be used to execute implementations of the specification. In some examples, the example environment 100 enables entities to participate in a public blockchain 102. The example environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each, include any appropriate computing system that enables participation as a node in the public blockchain 102. Example computing devices include, without limitation, a server, a desktop computer, a laptop computer, a tablet computing device, and a smartphone. In some examples, the computing systems 106, 108 hosts one or more computer-implemented services for interacting with the public blockchain 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the public blockchain 102 is represented as a peer-to-peer network of nodes, and the computing systems 106, 108 provide nodes of the first entity, and second entity respectively, which participate in the public blockchain 102.

Figure 2:
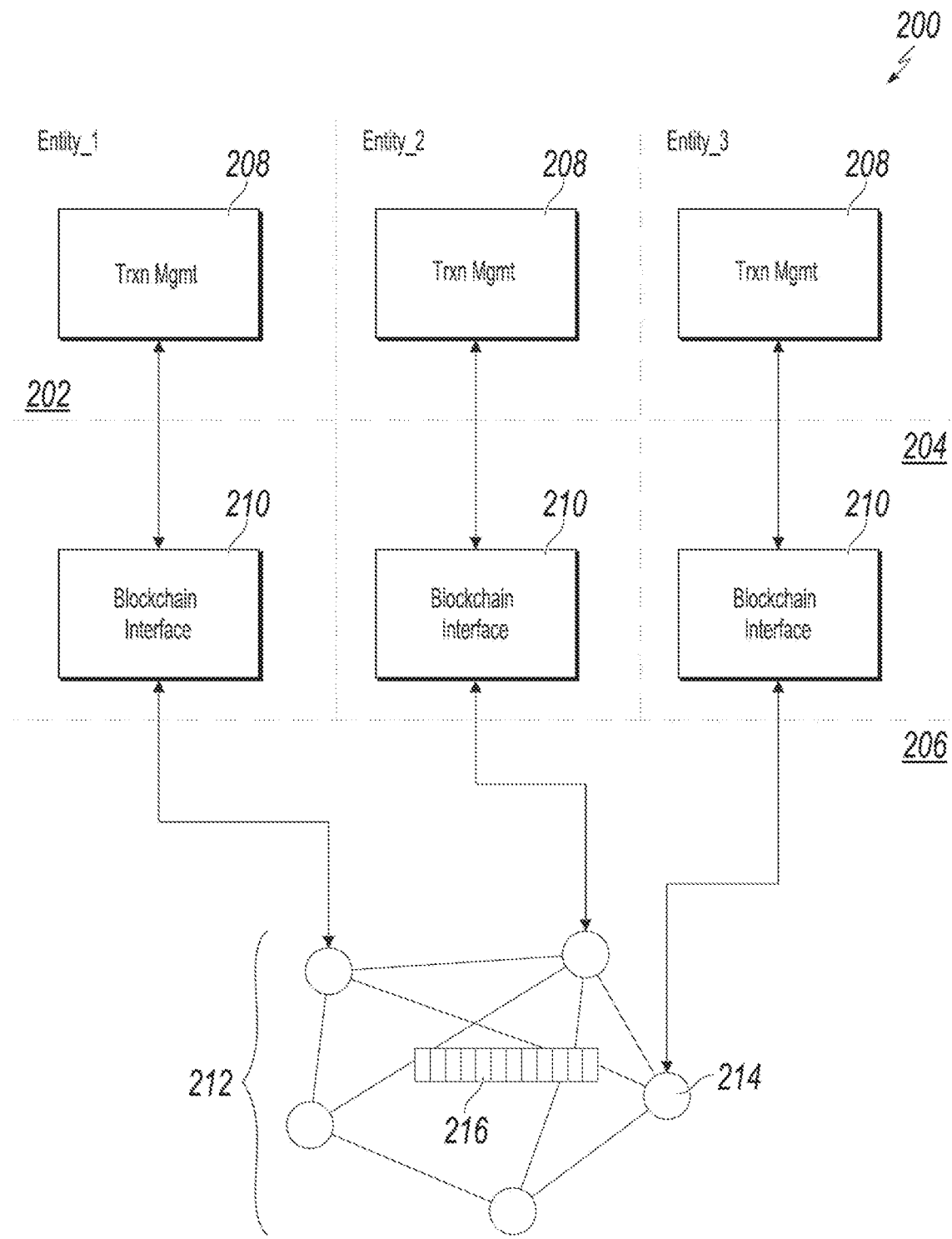
FIG. 2 depicts an example of a conceptual architecture in accordance with implementations of the specification.

FIG. 2 depicts an example of a conceptual architecture 200 in accordance with implementations of the specification. The example conceptual architecture 200 includes an entity layer 202, a hosted services layer 204, and a public blockchain layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes blockchain interfaces 210 for each transaction management system 208. In some examples, a respective transaction management system 208 communicates with a respective blockchain interface 210 over a network (e.g., the network 110 of FIG. 1) using a communication protocol (e.g., hypertext transfer protocol secure (HTTPS)). In some examples, each blockchain interface 210 provides a communication connection between a respective transaction management system 208, and the blockchain layer 206. More particularly, each blockchain interface 210 enables the respective entity to conduct transactions recorded in a blockchain network 212 of the blockchain layer 206. In some examples, communication between a blockchain interface 210, and the blockchain layer 206 is conducted using remote procedure calls (RPCs). In some examples, the blockchain interfaces 210 "host" blockchain nodes for the respective transaction management systems 208. For example, the blockchain interfaces 210 provide the application programming interface (API) for access to the blockchain network 212.

As described herein, the blockchain network 212 is provided as a peer-to-peer network, including a plurality of nodes 214 that immutably record information in a blockchain 216. Although a single blockchain 216 is schematically depicted, multiple copies of the blockchain 216 are provided and are maintained across the blockchain network 212. For example, each node 214 stores a copy of the blockchain 216. In some implementations, the blockchain 216 stores information associated with transactions that are performed between two or more entities participating in the public blockchain.

Figure 3:
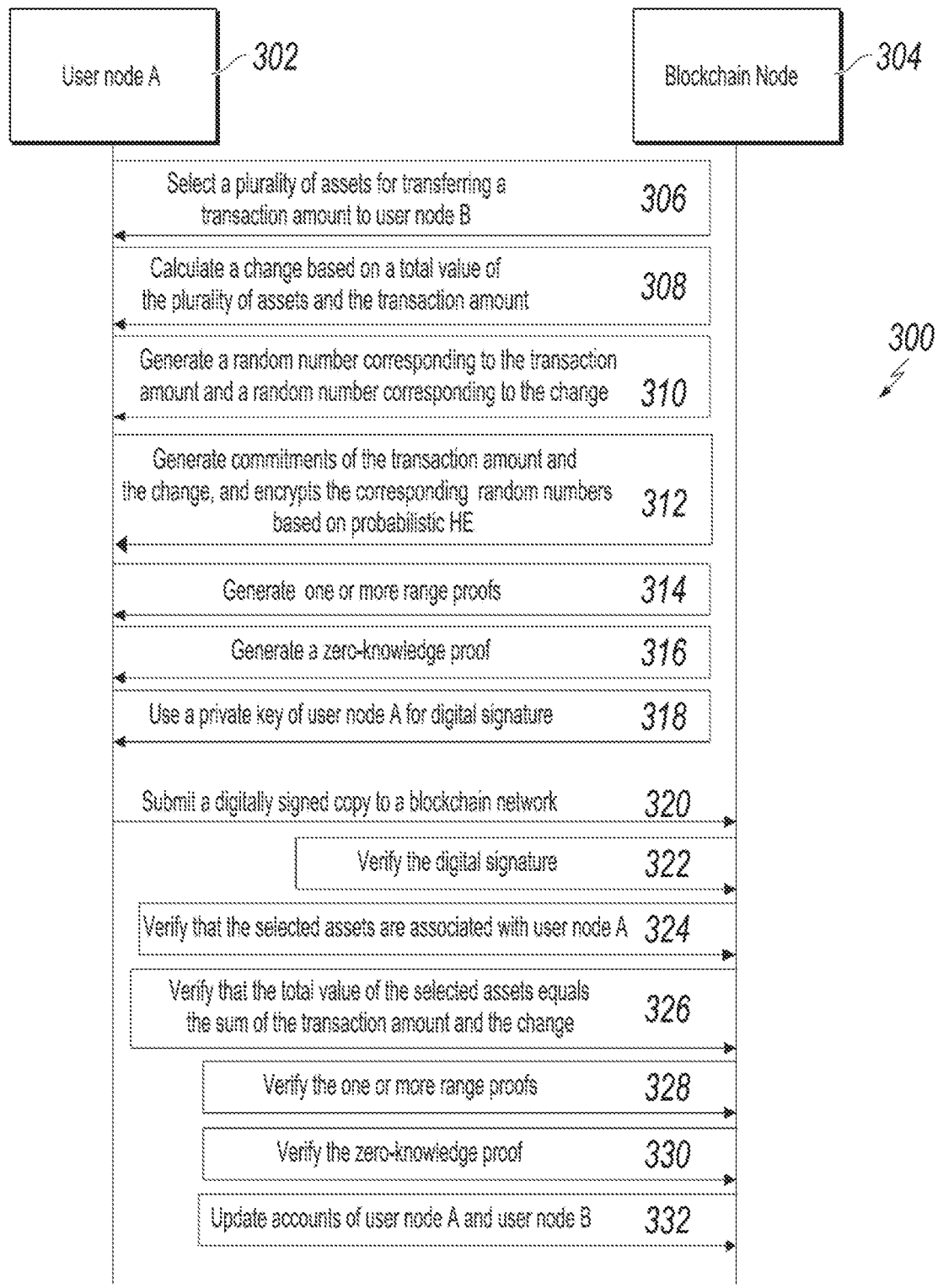
FIG. 3 depicts an example of a process of privacy-protected validation of a blockchain transaction based on homomorphic encryption.

FIG. 3 depicts an example of a process 300 of privacy-protected validation of a blockchain transaction based on HE. At a high-level, the process 300 is performed by a user node A 302, a user node B (not shown in FIG. 3), and a blockchain node 304, also referred to as a consensus node. Both the account of the user node A 302, and the account of the user node B can have a record keeping model based on a generic account model. That is, the account records of the user node A 302 and the user node B are kept as a plurality of assets. A transaction, such as a transfer of value, can be made from the user node A 302 to the user node B. The user node A 302 can select one or more account assets that have a total value greater than or equal to the transaction amount to cover the transaction. The difference between a total value of the one or more assets and the transaction amount can be considered as the change of the transaction left to the user node A 302.

To protect account privacy, the user node A 302 can generate commitments of values of the assets used to cover the transaction. The user node A 302 can also generate a commitment of the transaction amount of the transaction. The user node A 302 can also use HE to encrypt the transaction amount, the change and the random numbers used to generate the commitments. To verify the validity of the transaction, the blockchain node 304 can compare the transaction amount, the change, and the random numbers hidden in commitments and encrypted by HE based on a ZKP. If the transaction amount, the change, and the random numbers match, the transaction is determined to be valid by the blockchain node 304. More details of process 300 are discussed in the following description of FIG. 3

At 306, the user node A 302 selects a plurality of assets for transferring a transaction amount to the user node B. The user node A 302 and user node B can be blockchain consensus nodes or user nodes that use the blockchain network without participating in the consensus process. As discussed earlier, the user node A 302 can use a generic account model to keep records. Instead of keeping account balance for record under the account balance model, the account value of the user node A 302 is measured by the total value of the assets it possesses. The user node A 302 can select a plurality of assets that have enough value to cover the transaction amount. For example, if the transaction amount is 7.5 US dollars, the user node A 302 can select three assets that are worth 5, 2, and 1 US dollars, respectively, to cover the transaction amount.

In some implementations, each asset can be associated with a transaction address or asset ID that identifies the corresponding asset. The asset ID can be the hashing of asset information. The asset IDs of k selected assets can be represented as $ID_1, \ldots, ID_k$.

At 308, the user node A 302 calculates a change based on a total value of the plurality of assets and the transaction amount. Because the assets are selected to have a total value greater than the transaction amount, the change can be calculated as the total value of the selected assets deducted by the transaction amount. Using t to represent the transaction amount and $t_0$ to represent the change, the calculation of the change can be expressed as $t_0 = a_1 + \ldots + a_k - t$, where $a_1, \ldots a_k$ are, respectively, the asset values of k assets selected by the user node A 302 to cover the transaction amount t.

At 310, the user node A 302 generates a random number corresponding to the transaction amount and a random number corresponding to the change. The random number corresponding to the transaction amount t can be denoted as r. The random number corresponding to the change $t_0$ can be denoted as $r_0$. In some implementations, a plurality of random numbers can be generated to produce commitments of the asset values. For example, assume $a_1, \ldots a_k$ are the asset values, the random numbers that correspond to the asset values can be expressed as $r_{a1}, \ldots, r_{ak}$.

In some implementations, the random number $r_0$ can be calculated instead of randomly generated. The calculation can be expressed as $r_0 = r_{a1} + \ldots + r_{ak} - r$, where r is the random number generated to produce commitment for the transaction amount t. By using the calculated random number $r_0$, the user node A 302 does not need to generate an additional ZKP to prove that the total value of assets transferred equals the total value of assets received. In some implementations, another random number r' can be calculated as $r' = r_1 + \ldots + r_k - r - r_0$, to assist with the ZKP.

At 312, the user node A 302 generates commitments of the transaction amount and the change, and encrypts the corresponding random numbers based on probabilistic HE. In some implementations, homomorphic commitment schemes, such as PC, can be used to generate the commitments. Using the PC as a non-limiting example, the PC of the transaction amount t can be generated by using the random number r, which can be expressed as $PC(r, t) = g^r h^t$, where g and h can be generators of an elliptical curve, and $PC(r, t)$ is a scalar multiplication of curve points. Similarly, the PC of the change $t_0$ can be expressed as $PC(r_0, t_0) = g^{r_0} h^{t_0}$.

The random number r can be encrypted using user node B's public key based on a probabilistic HE scheme, such as an Okamoto-Uchiyama (OU) encryption scheme. It is to be understood that other HE schemes, such as Boneh-Goh-Nissim can also be used. Using OU as a non-limiting example, the random number can be encrypted based on OU by treating the transaction amount t as a random number, which can be expressed as $OU_B(r, t) = u^r v^t$, or simply $OU_B(t)$, where u is a generator of $(Z/nZ)^*$ satisfying the conditions that $v = u^n \mod n$, and $n = p \times q$, where p and q are two prime numbers. Probabilistic OU can satisfy the property that $OU(a+b) = OU(a) \times OU(b)$, where a and b are the plaintext used for OU.

The random number $r_0$ can be encrypted using the public key of the user node A 302. The random number can be encrypted based on OU by treating the change $t_0$ as a random number, which can be expressed as $OU_A(r_0, t_0)$.

The cyphertext of the transaction amount can then be expressed as $T = (PC(t, r), OU_B(r, t))$, and the cyphertext of the change can be expressed as $T_0 = (PC(t_0, r_0), OU_A(r_0, t_0))$. Similarly, the cyphertext of the k selected assets can be expressed as $T_i = (PC(t_i, r_i), OU_A(r_i, t_i))$, where $i = 1, \ldots, k$.

At 314, the user node A 302 generates one or more range proofs. In some implementations, a first range proof, $RP_1$, can be generated to show that the transaction amount $t \geq 0$. A second range proof, $RP_2$, can be generated to show that the change $t_0 \geq 0$, or in other words, the total value of the plurality of assets is greater than, or equal to, the transaction amount.

At 316, the user node A 302 generates a ZKP. The ZKP can be used to show that the random number and the transaction amount hidden in $PC(r, t)$ is the same as the random number and the transaction amount encrypted in $OU_B(r, t)$, and the random number and the transaction amount hidden in $PC(r_0, t_0)$ is the same as the random number and the transaction amount encrypted in $OU_A(r_0, t_0)$. To generate the ZKP, two random numbers $t'_1$ and $r'_1$ can be selected. The two random numbers can be used to generate three values, which are $P = PC(t'_1, r'_1)$, $P' = OU_B(r'_1, t'_1)$, $P'' = OU_A(r'_1, t'_1)$. The three values can then be used to generate a hash expressed as $x = Hash(P, P', P'')$. the hash value x can be used to calculate $t'_2 = t'_1 + xt$, $r'_2 = r'_1 + xr$, $t'_3 = t'_1 + xt$, and $r'_3 = r'_1 + xr_0$. The ZKP can then be expressed as $(P, P', t'_2, r'_2, P'', t'_3, r'_3)$.

At 318, the user node A 302 uses a private key to generate a digital signature to sign transaction data. In some implementations, the transaction data can include the asset IDs of the k selected assets ($ID_1, \ldots, ID_k$), the cyphertext of the transaction amount (T), the cyphertext of the change ($T_0$), the range proofs ($RP_1$ and $RP_2$), the random number r', and the ZKP.

At 320, the user node A 302 submits the digitally signed copy of the transaction data to a blockchain network.

At 322, the blockchain node 304 verifies the digital signature. The verification of the digital signature can be performed to ensure that the transaction data are sent by the user node A 302. In some implementations, the blockchain node 304 includes an anti-double spending mechanism that can verify if the transaction has already been performed. If so, the blockchain node 304 can reject the transaction.

At 324, the blockchain node 304 verifies if the selected assets are associated with the user node A's account. The verification can be based on the asset IDs of the assets.

At 326, the blockchain node 304 verifies that the total value of the selected plurality of assets equals the sum of the transaction amount and the change. In other words, the blockchain verifies that $a_1 + \ldots + a_k = t + t_0$. As discussed earlier, under the generic account model, the assets can be kept on the blockchain as PCs to protect data privacy. Based on the homomorphism of PC, $PC(r_{a1}, a_1) \times \ldots \times PC(r_{ak}, a_k) = PC(r_{a1} + \ldots + r_{ak}, a_1 + \ldots + a_k)$, and $PC(r, t) \times PC(r_0, t_0) = PC(r + r_0, t + t_0)$. Therefore, by showing that $PC(r_{a1}, a_1) \times \ldots \times PC(r_{ak}, a_k) = PC(r, t) \times PC(r_0, t_0) \times g^{r'}$, it can be proven that $a_1 + \ldots + a_k = t + t_0$.

At 328, the blockchain node 304 verifies the one or more range proofs.

At 330, the blockchain node 304 verifies the ZKP. As discussed above, the ZKP can be generated to verify whether the random number corresponding to the transaction amount encrypted using the public key of the user node B is the same as the corresponding random number hidden by the PC, and whether the random number corresponding to the change encrypted using the public key of the user node A 302 is the same as the corresponding random number hidden by the PC. In some implementations, to verify the ZKP, the blockchain node 304 can first calculate the hash value x as $x = Hash(P, P', P'')$. The blockchain node 304 can then verify whether $PC(t'_2, r'_2) = P \times PC(t, r)^x$, $OU_B(r'_2, t'_2) = P' \times OU_B(r, t)^x$, $PC(t'_3, r'_3) = P \times PC(t_0, r_0)^x$, and $OU_A(r'_3, t'_3) = P'' \times OU_A(r_0, t_0)^x$ are all true. If all are true, the example process 300 proceeds to 332. Otherwise, the blockchain node 304 can reject the transaction.

At 332, the blockchain node 304 updates the accounts of the user node A 302 and the user node B. Because the accounts of the user node A 302 and the user node B keep assets as records under the generic account model, after the transaction, the plurality of assets transferred from the user node A 302 can be removed from the account of the user node A 302. The change can be added back to the account of the user node A 302. The transaction amount, and the corresponding asset ID can be added as a new asset to the account of the user node B. In some implementations, the update can be performed based on updating asset lists maintained by corresponding accounts of the user node A 302 and the user node B. In some implementations, the update can be performed based on adding cyphertexts of the transaction amount and the change to the encrypted asset values maintained by the user node A 302 and the user node B. Updating of the accounts is described in further details herein with reference to FIG. 4.

Figure 4:
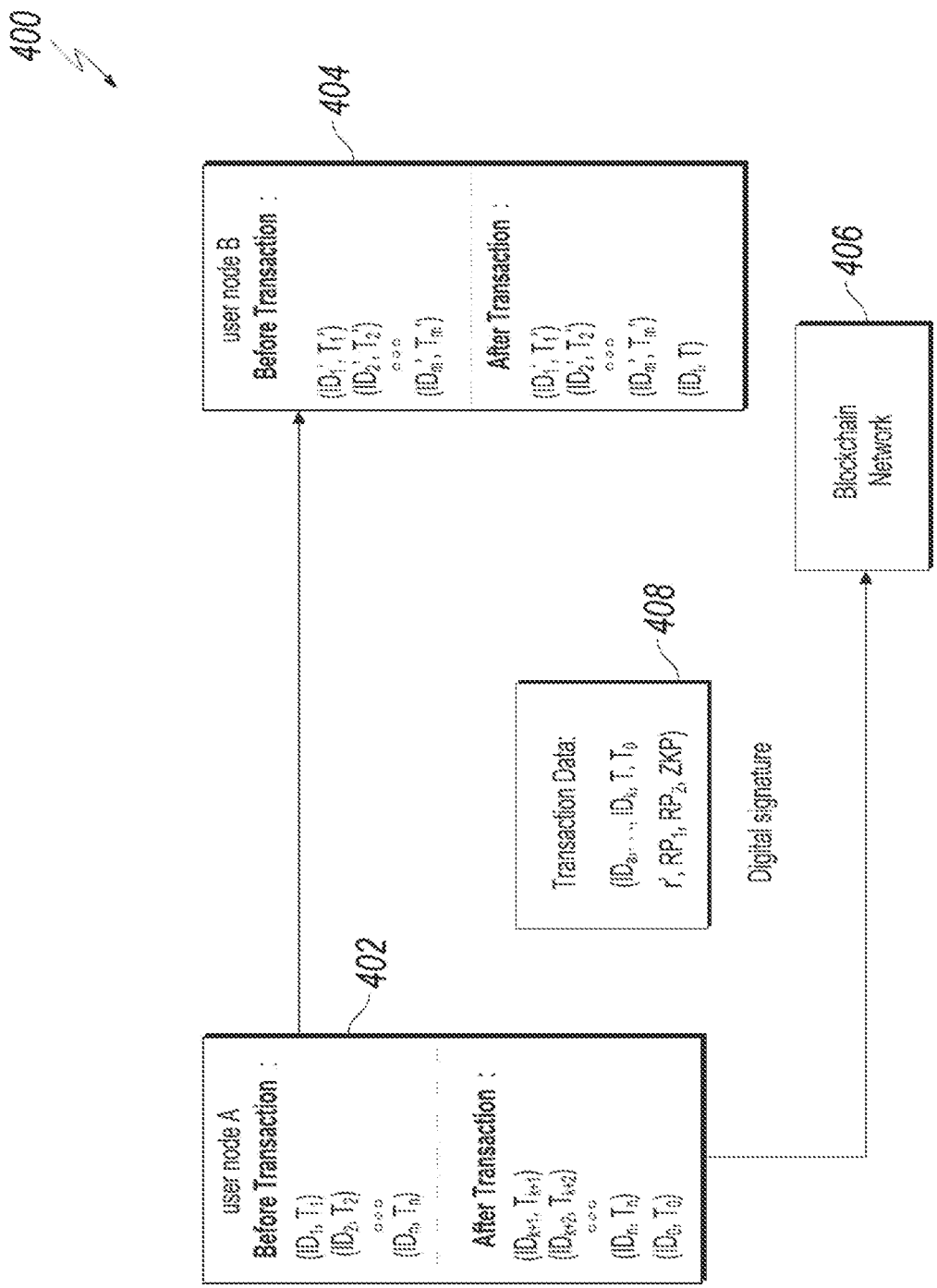
FIG. 4 depicts an example of a blockchain transaction in accordance with implementations of the specification.

FIG. 4 depicts an example of a blockchain transaction 400 in accordance with implementations of the specification. As shown in the example blockchain transaction 400, a user node A 402 transfers a transaction amount t to a user node B 404. Before the transaction, the user node A 402 has n assets including $(ID_1, T_1)$, $(ID_2, T_2)$, $(ID_n, T_n)$.

Using the commitment schemes, encryption schemes, and transaction process described herein with reference to FIG. 3 as an example, the user node A 402 can generate the transaction data 408, which can include asset IDs of the k selected assets, ID, $ID_2$, . . . , $ID_k$. The transaction data 408 can further include $T_0$, T, $RP_1$, $RP_2$, r', and the ZKP. After the transaction data 408 are generated, the user node A 402 can add its digital signature and submit the digitally signed transaction data to the blockchain network 406 for consensus.

After the transaction, the k selected assets can be removed from the account of the user asset A 402. The change can be added back to the user node A 402. Therefore, the user node A 402 can have the following assets expressed as $(ID_k+1, T_{k+1})$, $(ID_{k+2}, T_{k+2})$, . . . , $(ID_n, T_n)$, $(ID_0, T_0)$ where $ID_0$ represents the asset ID of the change $t_0$.

Before the transaction, the user node B 404 has m assets, which can be expressed as $(ID_{1'}, T_{1'})$, $(ID_{2'}, T_{2'})$, $(ID_{m'}, T_{m'})$. After the transaction, the transaction amount can be added to the user node B 404. The user node B 404 can have the following assets expressed as $(ID_{1'}, T_{1'})$, $(ID_{2'}, T_{2'})$, $(ID_{m'}, T_{m'})$, $(ID_t, T)$ where $ID_t$ represents the asset ID of the transaction amount t.

Figure 5:
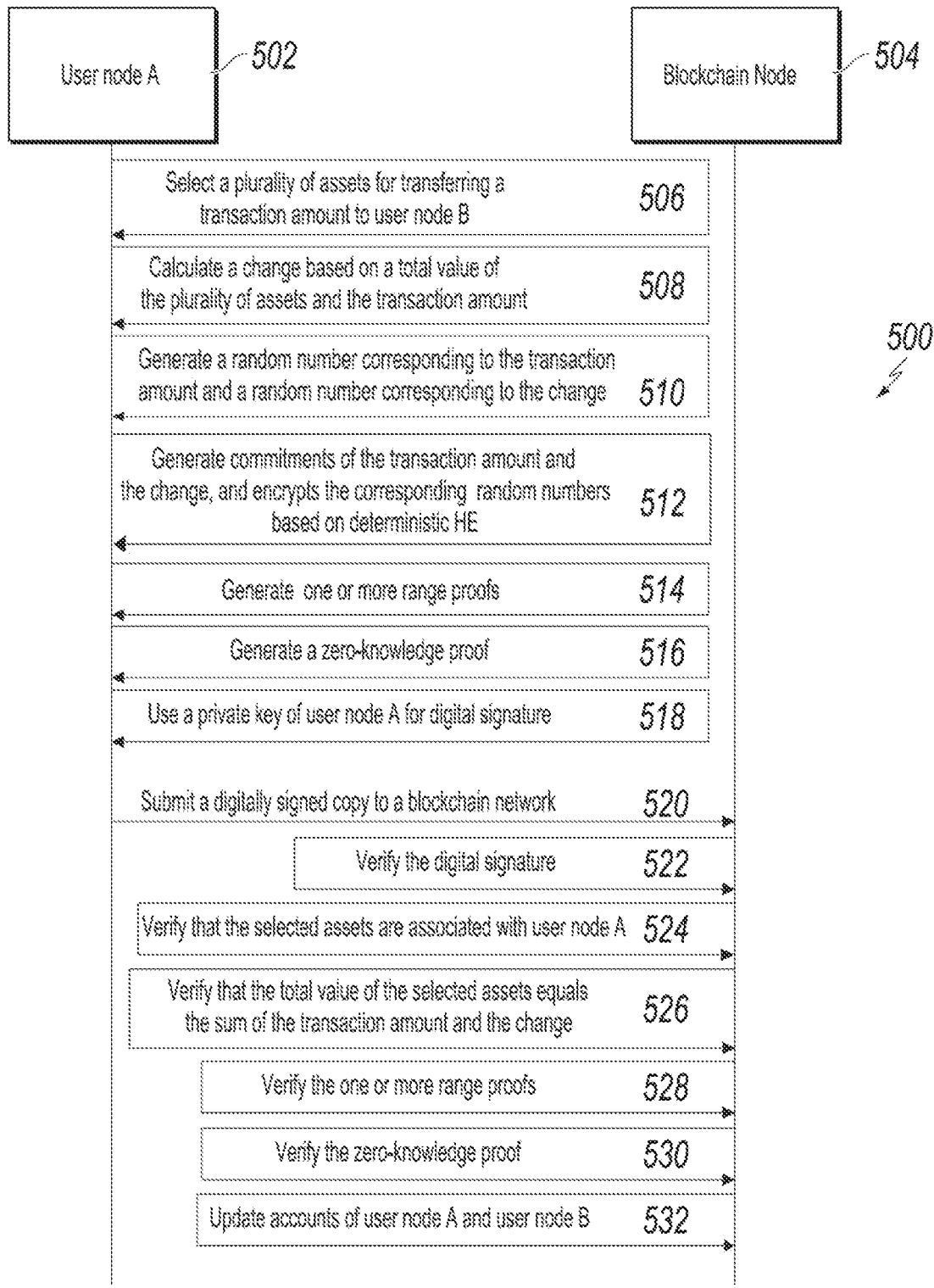
FIG. 5 depicts another example of a process of privacy-protected validation of a blockchain transaction based on homomorphic encryption.

FIG. 5 depicts an example of a process 500 of privacy-protected validation of a blockchain transaction based on HE. At a high-level, the example process 500 is performed by a user node A 502, a user node B (not shown in FIG. 5), and a blockchain node 504, also referred to as a consensus node. Both the account of the user node A 502, and the account of the user node B can be based on a generic account model. A transaction, such as a transfer of value, can be made from the user node A 502 to the user node B. The user node A 502 can select one or more account assets that have a total value greater than or equal to the transaction amount to cover the transaction. The difference between total value of the one or more assets and the transaction amount can be considered as the change of the transaction left to the user node A 502.

To protect account privacy, the user node A 502 can generate commitments of values of the assets used to cover the transaction, and the amount of the transaction using a commitment scheme, such as PC. The user node A 502 can also use linear deterministic HE to encrypt random numbers used to generate the commitments. Linear deterministic HE can have the following properties: $HE(s+t)=HE(s)\times HE(t)$, and $HE(kt)=HE(t)^k$. To verify the validity of the transaction, the blockchain node 504 can compare the random numbers hidden in the commitment and encrypted by HE based on a ZKP. If the random numbers match, the transaction can be determined to be valid by the blockchain node 504. More details of example process 500 are discussed in the following description of FIG. 5

At 506, the user node A 502 selects a plurality of assets for transferring a transaction amount to the user node B. The user node A 502 and user node B can be blockchain consensus node, or user nodes that use the blockchain network without participating in the consensus process. The user node A 502 can select a plurality of assets that have enough value to cover the transaction amount.

In some implementations, each asset can be associated with a transaction address or asset ID that identifies the corresponding asset. The asset ID can be the hashing of asset information. The asset IDs of k selected assets can be represented as $ID_1$, . . . , $ID_k$.

At 508, the user node A 502 calculates a change based on a total value of the plurality of assets and the transaction amount. Because the assets are selected to have a total value greater than the transaction amount, the change can be calculated as the total value of the selected assets deducted by the transaction amount. Using t to represent the transaction amount and $t_0$ to represent the change, the calculation of the change can be expressed as $t_0=a_1+ \ldots +a_k-t$, where $a_1, \ldots, a_k$ are, respectively, the asset values of k assets selected by the user node A 502 to cover a transaction amount t.

At 510, the user node A 502 generates a random number corresponding to the transaction amount and a random number corresponding to the change. The random number corresponding to the transaction amount t can be denoted as r. The random number corresponding to the change $t_0$ can be denoted as $r_0$. In some implementations, a plurality of random numbers can be generated to produce commitments of the asset values. For example, assume $a_1, \ldots, a_k$ are the asset values, the random numbers that correspond to the asset values can be expressed as $r_{a1}, \ldots, r_{ak}$.

In some implementations, the random number $r_0$ can be calculated instead of randomly generated. The calculation can be expressed as $r_0=r_{a1}+\ldots+r_{ak}-r$, where r is the random number generated to produce commitment for the transaction amount t. By calculating $r_0$, the user node A 502 does not need to generate an additional ZKP to show that the total value of assets transferred equals the total value of assets received. In some implementations, a random number r' can be calculated as $r'=r_1+ \ldots +r_k-r-r_0$.

At 512, the user node A 502 generates commitments of the transaction amount and the change, and encrypts the corresponding random numbers based on deterministic HE. In some implementations, homomorphic commitment schemes, such as PC, can be used to generate the commitments. Using the PC as a non-limiting example, the PC of the transaction amount t can be generated by using the random number r, which can be expressed as $PC(r, t)=g^r h^t$, where g and h can be generators of an elliptical curve, and $PC(r, t)$ is a scalar multiplication of curve points. Similarly, the PC of the change to can be expressed as $PC(r_0, t_0)=g^{r_0}h^{t_0}$.

The random number r can be encrypted using the public key of the user node B based on linear deterministic HE. The linear deterministic HE can be obtained from probabilistic HE, such as Paillier, Benaloh, OU, Naccache-Stern, Boneh-Goh-Nissim, Damgard-Jurik, or equal-probability HE, by fixing the random number in the HE scheme to 0 or 1 or other appropriate number. The encrypted random number can be expressed as HE(r).

The random number $r_0$ can be encrypted using user node A's public key. The random number can be encrypted based on linear deterministic HE. The encrypted random number can be expressed as $HE(r^0)$.

The cyphertext of the transaction amount t can then be expressed as $T=(g^r h^t, HE_B(r))$, and the cyphertext of the change can be expressed as $T_0=(g^{r0} h^{t0}, HE_A(r_0))$. Similarly, the cyphertext of the k selected assets can be expressed as $T_i=(g^{ri} h^{ti}, HE(r_i))$, where i=1, . . . , k.

At 514, the user node A 502 generates one or more range proofs. In some implementations, a first range proof, $RP_1$, can be generated to show that the transaction amount t≥0. A second range proof, $RP_2$, can be generated to show that the change $t_0 \geq 0$, or in other words, the total value of the plurality of assets is greater than or equal to the transaction amount.

At 516, the user node A 502 generates a ZKP. The ZKP can be used to show that the random number hidden in PC(r, t) is the same as the random number encrypted in HE(r), and the random number hidden in $PC(r_0, t_0)$ is the same as the random number encrypted in $HE(r_0)$. To generate the ZKP, two random numbers $t'_1$ and $r'_1$ can be selected. The two random numbers can be used to generate three values, which are $P=g^{r'1} h^{t'1}$, $P'=HE_B(r'_1)$, $P''=HE_A(r'_1)$. The three values can then be used to generate a hash expressed as x=Hash(P, P', P''). the hash value x can be used to calculate $t'_2=t'_1+xt$, $r'_2=r'_1+xr$, $t'_3=t'_1+xt$, and $r'_3=r'_1+xr_0$. The ZKP can then be expressed as (P, P', $t'_2$, $r'_2$, P''', $t'_3$, $r'_3$).

At 518, the user node A 502 uses a private key to generate a digital signature to sign transaction data. In some implementations, the transaction data can include the asset IDs of the k selected assets ($ID_1$, . . . , $ID_k$), the cyphertext of the transaction amount (T), the cyphertext of the change ($T_0$), the range proofs ($RP_1$ and $RP_2$), the random number r', and the ZKP.

At 520, the user node A 502 submits the digitally signed copy of the transaction data to a blockchain network.

At 522, the blockchain node 504 verifies the digital signature. The verification of the digital signature can be performed to ensure that the transaction data are sent by the user node A 502. In some implementations, the blockchain node 504 includes an anti-double spending mechanism that can verify whether the transaction has already been performed. If so, the blockchain node 504 can reject the transaction.

At 524, the blockchain node 504 verifies whether the selected assets are associated with the user node A's account. The verification can be based on the asset IDs of the assets.

At 526, the blockchain node 504 verifies that the total value of the selected plurality of assets equals the sum of the transaction amount and the change. In other words, the blockchain node 504 verifies that $a_1+ \ldots +a_k=t+t_0$. As discussed earlier, under the generic account model, the assets can be kept on the blockchain as PCs to protect data privacy. Based on the homomorphism of PC, $PC(r_{a1}, a_1) \times \ldots \times PC(r_{ak}, a_k)=PC(r_{a1}+ \ldots +r_{ak}, a_1+ \ldots +a_k)$, and $PC(r, t) \times PC(r_0, t_0)=PC(r+r_0, t+t_0)$. Therefore, by showing that $PC(r_{a1}, a_1) \times \ldots \times PC(r_{ak}, a_k)=PC(r, t) \times PC(r_0, t_0) \times g^{r'}$, it can be proven that $a_1+ \ldots +a_k=t+t_0$.

At 528, the blockchain node 504 verifies the one or more range proofs.

At 530, the blockchain node 504 verifies the ZKP. As discussed earlier, the ZKP can be generated to verify whether the random number corresponding to the transaction amount encrypted using the public key of the user node B is the same as the corresponding random number hidden by the PC, and whether the random number corresponding to the change encrypted using the public key of the user node A 502 is the same as the corresponding random number hidden by the PC. In some implementations, to verify the ZKP, the blockchain node 504 can first calculate the hash value x as x=Hash(P, P', P''). The blockchain node 504 can then verify whether $g^{r'2} h^{t'2}=P \times (g^r h^t)^x$, $HE_B(r')=P' \times HE(r)^x$, $g^{r'3} h^{t'3}=P \times (g^{r0} h^{t0})^x$, and $HE_A(r'_3)=P'' \times HE_A(r_0)^x$ are all true. If each is true, the example process 500 proceeds to 532. Otherwise, the blockchain node 504 can reject the transaction.

At 532, the blockchain node 504 updates the accounts of the user node A 502 and the user node B. Because the accounts of the user node A 502 and the user node B keep assets as records under the generic account model, after the transaction, the plurality of assets transferred from the user node A 502 can be removed from the account of the user node A 502. The change can be added back to the account of the user node A 502. The transaction amount, and the corresponding asset ID can be added as a new asset to the account of the user node B. In some implementations, the update can be performed based on updating asset lists maintained by corresponding accounts of the user node A 502 and the user node B. In some implementations, the update can be performed based on adding cyphertexts of the transaction amount and the change to the encrypted asset values maintained by the user node A 502 and the user node B. An example blockchain transaction 400 and the corresponding account updates are described in the description of FIG. 4.

Figure 6:
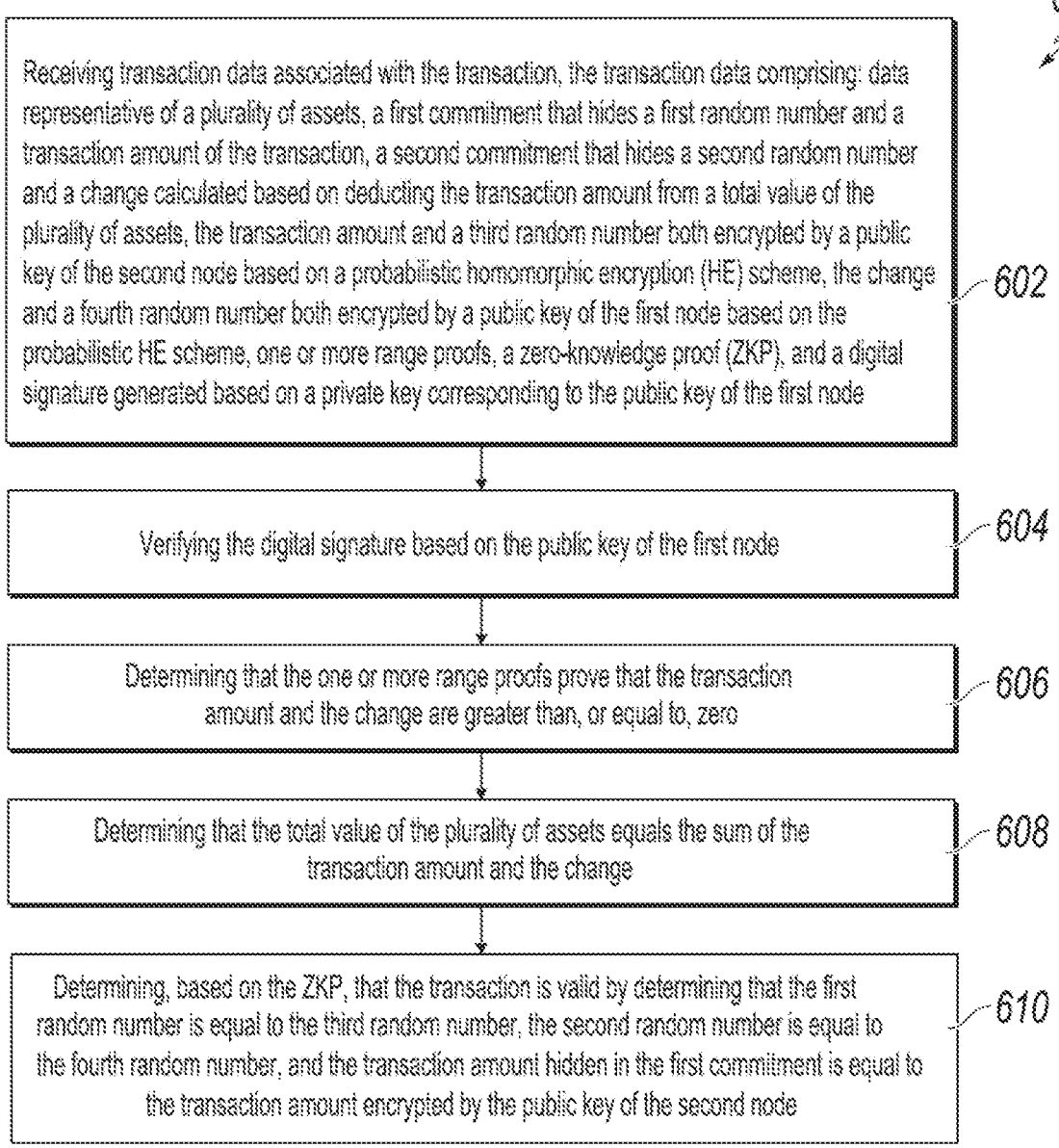
FIG. 6 depicts an example of a method that can be executed in accordance with implementations of the specification.

FIG. 6 depicts an example of a process 600 that can be executed in accordance with implementations of the specification. For clarity of presentation, the description that follows generally describes method 600 in the context of the other figures in this description. However, it will be understood that the example process 600 can be performed, for example, by any system, environment, software, and hardware, or a combination of systems, environments, software, and hardware, as appropriate. In some implementations, steps of the example process 600 can be run in parallel, in combination, in loops, or in any order.

At 602, a consensus node receives transaction data associated with the transaction. In some examples, the transaction data comprises data representative of a plurality of assets, a first commitment that hides a first random number and a transaction amount of the transaction, a second commitment that hides a second random number and a change calculated based on deducting the transaction amount from a total value of the plurality of assets, the transaction amount and a third random number both encrypted by a public key of the second node based on a probabilistic HE scheme, the change and a fourth random number both encrypted by a public key of the first node based on the probabilistic HE scheme, one or more range proofs, a ZKP, and a digital signature generated based on a private key corresponding to the public key of the first node.

In some implementations, each of the plurality of assets is associated with one or more of an asset type, an asset value hidden in a commitment, and a random number used for generating the commitment. In some implementations, the consensus node determines that each of the plurality of assets is associated with a same asset type. In some implementations, the first commitment, the second commitment, and the commitment that hides the asset value are generated based on a commitment scheme that is homomorphic.

In some implementations, the third random number is encrypted based on the probabilistic HE scheme by treating the transaction amount as a random number, and the fourth random number is encrypted based on the probabilistic HE scheme by treating the change as a random number. In some implementations, the first commitment and the second commitment are generated based on a Pedersen commitment scheme, and the probabilistic HE scheme is an OU encryption scheme.

In some implementations, the ZKP comprises a Pedersen commitment that hides a fifth random number and a sixth random number, a cyphertext of the fifth random number and the sixth random number encrypted by the public key of the second account based on the OU encryption scheme, and a cyphertext of the fifth random number and the sixth random number encrypted by the public key of the first account based on the OU encryption scheme.

At 604, the consensus node verifies the digital signature based on the public key of the first node.

At 606, the consensus node determines the one or more range proofs prove that the transaction amount and the change are each greater than, or equal to, zero.

At 608, the consensus node determines that the total value of the plurality of notes equals the sum of the transaction amount and the change. In some implementations, the determining that the total value of the plurality of assets equals the sum of the transaction amount and the change is performed based on homomorphism of the commitment scheme.

At 610, the consensus node determines, based on the ZKP, that the transaction is valid by determining that the first random number is equal to the third random number, the second random number is equal to the fourth random number, and the transaction amount hidden in the first commitment is equal to the transaction amount encrypted by the public key of the second node.

In some implementations, the transaction is performed between an account associated with the first node and an account associated with the second node, and the method further comprises updating, after determining that the transaction is valid, the account associated with the first node and the account associated with the second node based on the transaction amount and the change. In some implementations, the ZKP is generated and used for determining that the transaction is valid based on properties of the probabilistic HE. In some implementations, the determining that the transaction is valid is performed based on the ZKP without interactions between the first node and the second node through outside of the blockchain network.

Figure 7:
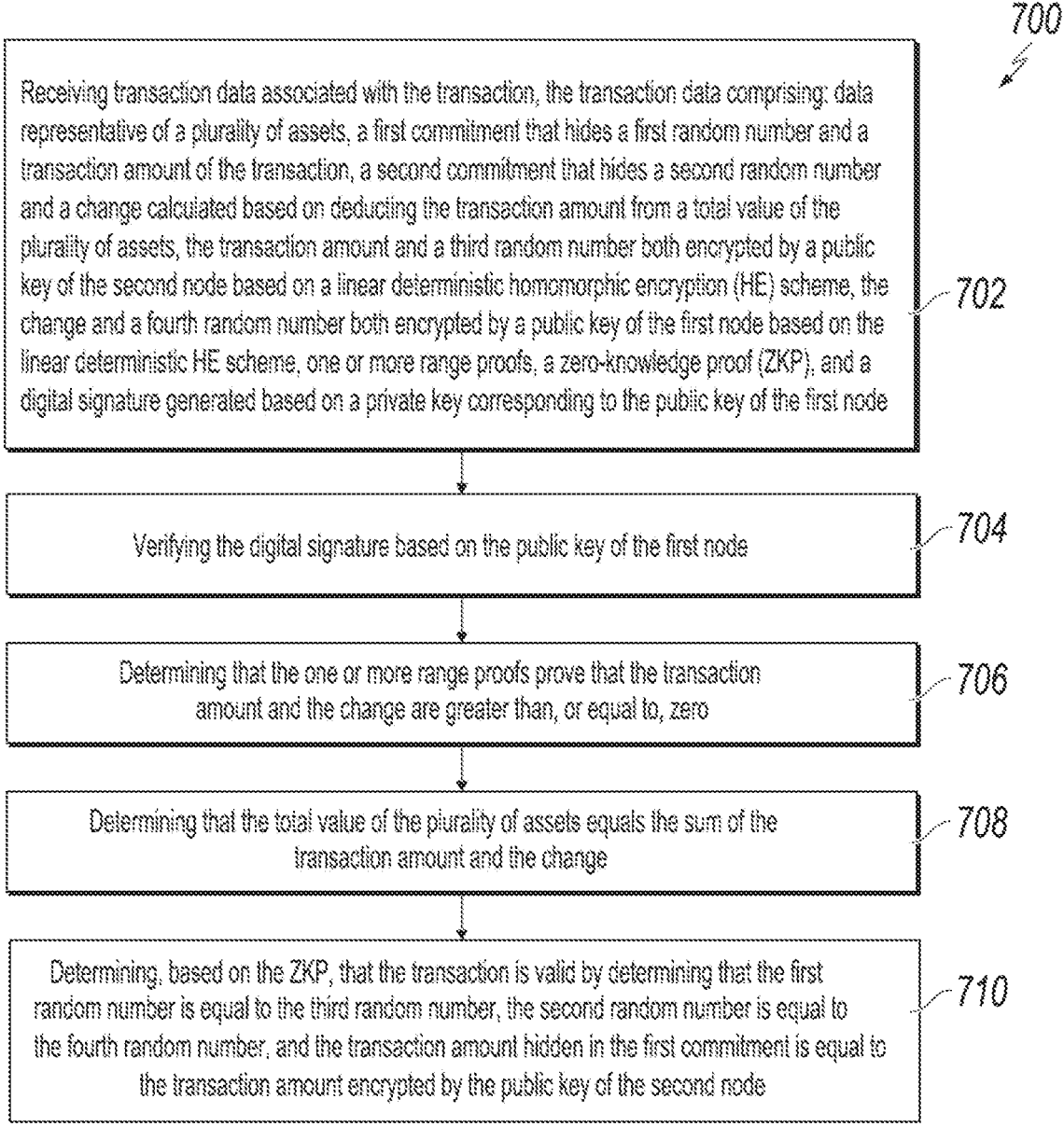
FIG. 7 depicts another example of a method that can be executed in accordance with implementations of the specification.

FIG. 7 depicts an example process 700 that can be executed in accordance with implementations of the specification. For clarity of presentation, the description that follows generally describes method 700 in the context of the other figures in this description. However, it will be understood that the example process 700 can be performed, for example, by any system, environment, software, and hardware, or a combination of systems, environments, software, and hardware, as appropriate. In some implementations, steps of the example process 700 can be run in parallel, in combination, in loops, or in any order.

At 702, a consensus node receives transaction data associated with the transaction. In some examples, the transaction data comprises data representative of a plurality of assets, a first commitment that hides a first random number and a transaction amount of the transaction, a second commitment that hides a second random number and a change calculated based on deducting the transaction amount from a total value of the plurality of assets, the transaction amount and a third random number both encrypted by a public key of the second node based on a linear deterministic HE scheme, the change and a fourth random number both encrypted by a public key of the first node based on the linear deterministic HE scheme, one or more range proofs, a ZKP, and a digital signature generated based on a private key corresponding to the public key of the first node.

In some implementations, each of the plurality of assets is associated with one or more of an asset type, an asset value hidden in a commitment, and a random number used for generating the commitment. In some implementations, the consensus node determines that each of the plurality of assets is associated with a same asset type. In some implementations, the first commitment, the second commitment, and the commitment that hides the asset value are generated based on a commitment scheme that is homomorphic.

In some implementations, the linear deterministic HE scheme is derived from a probabilistic HE scheme based on changing a random number associated with the probabilistic HE scheme to a fixed number.

In some implementations, the ZKP comprises a commitment that hides a fifth random number and a sixth random number, a cyphertext of the fifth random number and the sixth random number encrypted by the public key of the second account based on the linear deterministic HE scheme, and a cyphertext of the fifth random number and the sixth random number encrypted by the public key of the first account based on the linear deterministic HE scheme.

At 704, the consensus node verifies the digital signature based on the public key of the first node.

At 706, the consensus node determines the one or more range proofs prove that the transaction amount and the change are each greater than, or equal to, zero.

At 708, the consensus node determines that the total value of the plurality of notes equals the sum of the transaction amount and the change. In some implementations, the determining that the total value of the plurality of assets equals the sum of the transaction amount and the change is performed based on homomorphism of the commitment scheme.

At 710, the consensus node determines, based on the ZKP, that the transaction is valid by determining that the first random number is equal to the third random number, the second random number is equal to the fourth random number, and the transaction amount hidden in the first commitment is equal to the transaction amount encrypted by the public key of the second node.

In some implementations, the transaction is performed between an account associated with the first node and an account associated with the second node, and the method further comprises updating, after determining that the transaction is valid, the account associated with the first node and the account associated with the second node based on the transaction amount and the change. In some implementations, the ZKP is generated and used for determining that the transaction is valid based on properties of the linear deterministic HE. In some implementations, the determining that the transaction is valid is performed based on the ZKP without interactions between the first node and the second node through outside of the blockchain network.

Figure 8:
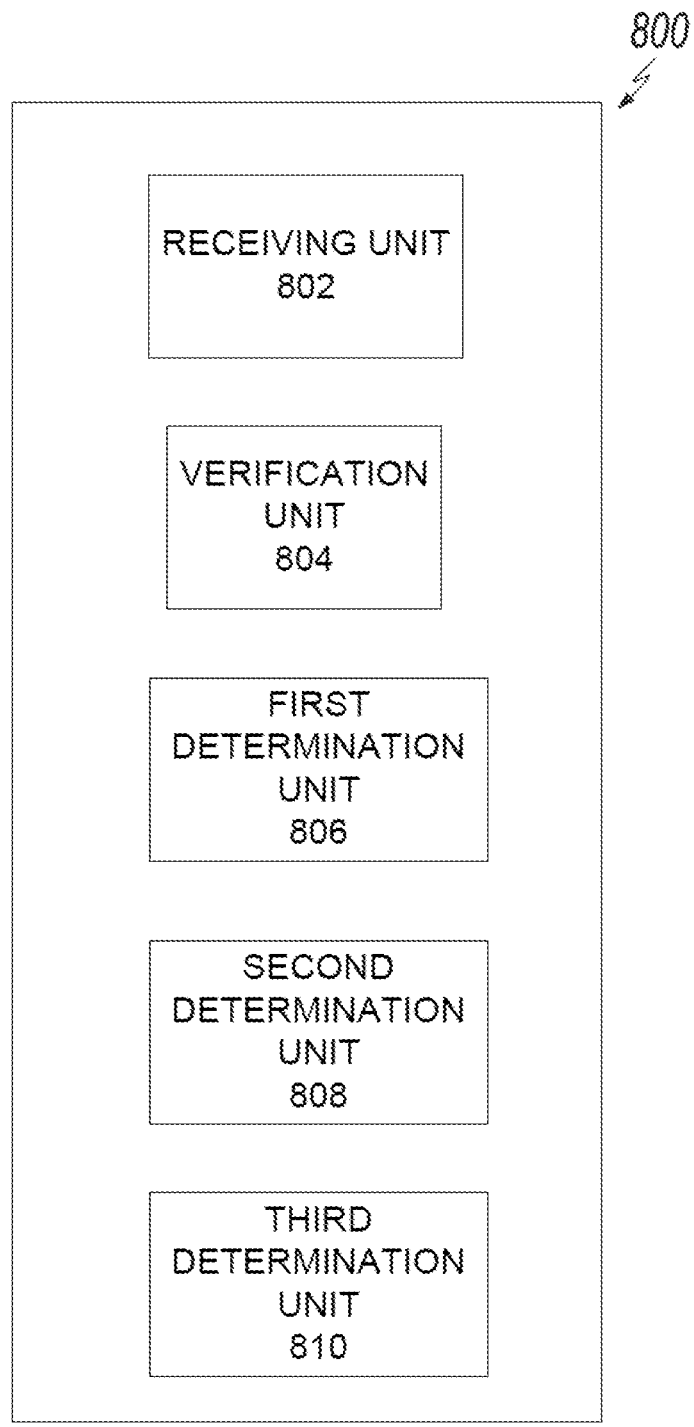
FIG. 8 depicts an example of a blockchain node that can perform a process in accordance with implementations of the specification.

FIG. 8 depicts an example of a blockchain node 800 that can perform a process in accordance with implementations of the specification. At a high level, the blockchain node 800 includes a receiving unit 802, a verification unit 804, a first determination unit 806, a second determination unit 808, and a third determination unit 810.

In some implementations, the receiving unit 802 is operable to receive transaction data associated with the transaction. In some examples, the transaction data comprises data representative of a plurality of assets, a first commitment that hides a first random number and a transaction amount of the transaction, a second commitment that hides a second random number and a change calculated based on deducting the transaction amount from a total value of the plurality of assets, the transaction amount and a third random number both encrypted by a public key of the second node based on a probabilistic HE scheme, the change and a fourth random number both encrypted by a public key of the first node based on the probabilistic HE scheme, one or more range proofs, a ZKP, and a digital signature generated based on a private key corresponding to the public key of the first node.

In some implementations, the receiving unit 802 is operable to receive transaction data associated with the transaction, the transaction data comprising: data representative of a plurality of assets, a first commitment that hides a first random number and a transaction amount of the transaction, a second commitment that hides a second random number and a change calculated based on deducting the transaction amount from a total value of the plurality of assets, the transaction amount and a third random number both encrypted by a public key of the second node based on a linear deterministic HE scheme, the change and a fourth random number both encrypted by a public key of the first node based on the linear deterministic HE scheme, one or more range proofs, a ZKP, and a digital signature generated based on a private key corresponding to the public key of the first node.

In some implementations, each of the plurality of assets is associated with one or more of an asset type, an asset value hidden in a commitment, and a random number used for generating the commitment. In some implementations, the blockchain node 800 determines that each of the plurality of assets is associated with a same asset type. In some implementations, the first commitment, the second commitment, and the commitment that hides the asset value are generated based on a commitment scheme that is homomorphic. In some implementations, the linear deterministic HE scheme is derived from a probabilistic HE scheme based on changing a random number associated with the probabilistic HE scheme to a fixed number.

In some implementations, the third random number is encrypted based on the probabilistic HE scheme by treating the transaction amount as a random number, and the fourth random number is encrypted based on the probabilistic HE scheme by treating the change as a random number. In some implementations, the first commitment and the second commitment are generated based on a Pedersen commitment scheme, and the probabilistic HE scheme is an OU encryption scheme.

In some implementations, the ZKP comprises a Pedersen commitment that hides a fifth random number and a sixth random number, a cyphertext of the fifth random number and the sixth random number encrypted by the public key of the second account based on the OU encryption scheme, and a cyphertext of the fifth random number and the sixth random number encrypted by the public key of the first account based on the OU encryption scheme. In some implementations, the ZKP comprises a commitment that hides a fifth random number and a sixth random number, a cyphertext of the fifth random number and the sixth random number encrypted by the public key of the second account based on the linear deterministic HE scheme, and a cyphertext of the fifth random number and the sixth random number encrypted by the public key of the first account based on the linear deterministic HE scheme.

The verification unit 804 is operable to verify the digital signature based on the public key of the first node.

The first determination unit 806 is operable to determine the one or more range proofs prove that the transaction amount and the change are each greater than, or equal to, zero.

The second determination unit 808 is operable to determine that the total value of the plurality of notes equals the sum of the transaction amount and the change. In some implementations, the determining that the total value of the plurality of assets equals the sum of the transaction amount and the change is performed based on homomorphism of the commitment scheme.

The third determination unit 810 is operable to determine, based on the ZKP, that the transaction is valid by determining that the first random number is equal to the third random number, the second random number is equal to the fourth random number, and the transaction amount hidden in the first commitment is equal to the transaction amount encrypted by the public key of the second node.

In some implementations, the transaction is performed between an account associated with the first node and an account associated with the second node, and the blockchain node 800 can include an updating unit operable to update, after the third determination unit 810 determines that the transaction is valid, the account associated with the first node and the account associated with the second node based on the transaction amount and the change. In some implementations, the ZKP is generated and used for determining that the transaction is valid based on properties of the probabilistic HE. In some implementations, the ZKP is generated and used for determining that the transaction is valid based on properties of the linear deterministic HE. In some implementations, the determining that the transaction is valid is performed based on the ZKP without interactions between the first node and the second node through outside of the blockchain network.

Implementations of the subject matter described in this specification can be implemented so as to realize particular advantages or technical effects. For example, implementations of the specification permits account balance and transaction amount of blockchain nodes to be private during transactions. The recipient of fund transfer does not need to confirm the transaction or use a random number to verify a commitment, the transaction validation can be non-interactive. A blockchain node can validate the transaction based on HE and commitment schemes to allow zero-knowledge proof.

The described methodology permits enhancement of account/data security of various mobile computing device. The balance of the accounts and transaction amounts can be encrypted based on HE and hidden by commitment schemes. As such, a consensus node can update the account balances in the ledger after transaction based on properties of HE without revealing the actual account balance of the account. Because the random number does not need to be sent to a recipient to confirm the transaction, the risk of data leakage can be reduced and less computing and memory resources need to be used to manage the random number.

Implementations and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, implementations can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method performed by a consensus node using at least one or more hardware processors for validating a transaction between a first node and a second node within a blockchain network, the method comprising:
    receiving transaction data associated with the transaction, the transaction data comprising:
        data representative of a plurality of assets;
        a first commitment comprising a first random number and a transaction amount of the transaction;
        a second commitment comprising a second random number and a change calculated based on deducting the transaction amount from a total value of the plurality of assets, the transaction amount being encrypted by a public key of the second node;
        a third random number encrypted with the transaction amount by the public key of the second node; and
        the change and a fourth random number encrypted by the public key of the first node;
    determining that the transaction amount and the change are each greater than, or equal to, zero;
    determining that the total value of the plurality of assets equals a sum of the transaction amount and the change; and
    determining that the transaction is valid by determining that the transaction amount is equal to the transaction amount encrypted by the public key of the second node, determining that the first random number is equal to the third random number, and determining that the second random number is equal to the fourth random number.

2. The computer-implemented method of claim 1, wherein:
    the third random number is encrypted with the transaction amount by the public key of the second node based upon on a linear deterministic homomorphic encryption (HE) scheme; and
    the change and a fourth random number are encrypted by the public key of the first node based upon the linear deterministic HE scheme.

3. The computer-implemented method of claim 1, wherein the transaction data includes one or more range proofs, a zero-knowledge proof (ZKP), and a digital signature generated based on a private key corresponding to the public key of the first node.

4. The computer-implemented method of claim 3, wherein determining that the transaction amount and the change are each greater than, or equal to, zero is based upon the one or more range proofs.

5. The computer-implemented method of claim 4, wherein determining that the transaction is valid is based upon the ZKP.

6. The computer-implemented method of claim 3, further comprising verifying the digital signature based on the public key of the first node.

7. A non-transitory, computer-readable medium storing one or more instructions executable by a computer system to perform operations comprising:
    receiving transaction data associated with a transaction between a first node and a second node within a blockchain network, the transaction data comprising:
        data representative of a plurality of assets;
        a first commitment comprising a first random number and a transaction amount of the transaction;
        a second commitment comprising a second random number and a change calculated based on deducting the transaction amount from a total value of the plurality of assets, the transaction amount being encrypted by a public key of the second node;
        a third random number encrypted with the transaction amount by the public key of the second node; and
        the change and a fourth random number encrypted by the public key of the first node:
    determining that the transaction amount and the change are each greater than, or equal to, zero;
    determining that the total value of the plurality of assets equals a sum of the transaction amount and the change; and
    determining that the transaction is valid by determining that the transaction amount is equal to the transaction amount encrypted by the public key of the second node, determining that the first random number is equal to the third random number, and determining that the second random number is equal to the fourth random number.

8. The non-transitory, computer-readable medium of claim 7, wherein:
    the third random number is encrypted with the transaction amount by the public key of the second node based upon on a linear deterministic homomorphic encryption (HE) scheme; and
    the change and a fourth random number are encrypted by the public key of the first node based upon the linear deterministic HE scheme.

9. The non-transitory, computer-readable medium of claim 7, wherein the transaction data includes one or more range proofs, a zero-knowledge proof (ZKP), and a digital signature generated based on a private key corresponding to the public key of the first node.

10. The non-transitory, computer-readable medium of claim 9, wherein determining that the transaction amount and the change are each greater than, or equal to, zero is based upon the one or more range proofs.

11. The non-transitory, computer-readable medium of claim 10, wherein determining that the transaction is valid is based upon the ZKP.

12. The non-transitory, computer-readable medium of claim 9, further comprising verifying the digital signature based on the public key of the first node.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        receiving transaction data associated a transaction between a first node and a second node within a blockchain network, the transaction data comprising:
            data representative of a plurality of assets;
            a first commitment comprising a first random number and a transaction amount of the transaction;

a second commitment comprising a second random number and a change calculated based on deducting the transaction amount from a total value of the plurality of assets, the transaction amount being encrypted by a public key of the second node;

a third random number encrypted with the transaction amount by the public key of the second node; and the change and a fourth random number encrypted by the public key of the first node;

determining that the transaction amount and the change are each greater than, or equal to, zero;

determining that the total value of the plurality of assets equals a sum of the transaction amount and the change; and determining that the transaction is valid by determining that the transaction amount is equal to the transaction amount encrypted by the public key of the second node, determining that the first random number is equal to the third random number, and determining that the second random number is equal to the fourth random number.

14. The computer-implemented system of claim 13, wherein:

the third random number is encrypted with the transaction amount by the public key of the second node based upon on a linear deterministic homomorphic encryption (HE) scheme; and the change and a fourth random number are encrypted by the public key of the first node based upon the linear deterministic HE scheme.

15. The computer-implemented system of claim 13, wherein the transaction data includes one or more range proofs, a zero-knowledge proof (ZKP), and a digital signature generated based on a private key corresponding to the public key of the first node.

16. The computer-implemented system of claim 15, wherein determining that the transaction amount and the change are each greater than, or equal to, zero is based upon the one or more range proofs.

17. The computer-implemented system of claim 16, further comprising:

verifying the digital signature based on the public key of the first node, wherein determining that the transaction is valid is based upon the ZKP.

* * * * *

UNITED STATES PATENT AND TRADEMARK OFFICE
CERTIFICATE OF CORRECTION

PATENT NO.         : 11,063,769 B2
APPLICATION NO.    : 16/945533
DATED              : July 13, 2021
INVENTOR(S)        : Wenbin Zhang, Baoli Ma and Huanyu Ma Page 1 of 1

It is certified that error appears in the above-identified patent and that said Letters Patent is hereby corrected as shown below:

In the Claims

Column 22/Line 18, In Claim 7, delete "node:", and insert -- node; --, therefor.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*